United States Patent
Thammana et al.

(10) Patent No.: US 12,418,459 B2
(45) Date of Patent: Sep. 16, 2025

(54) SYSTEMS, METHODS, AND APPARATUSES FOR PERFORMANCE-BASED COMMUNICATION SURVEILLANCE (PBCS) MONITORING

(71) Applicant: Honeywell International Inc., Charlotte, NC (US)

(72) Inventors: Pratheep Kumar Thammana, Atlanta, GA (US); James Buckner, Atlanta, GA (US); Karthik Kallaypally, Hyderbad (IN); Pushkar Thammana, Hyderabad (IN); Santosh Vaddapally, Hyderabad (IN); Carey Eugene Miller, Tucson, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 18/464,923

(22) Filed: Sep. 11, 2023

(65) Prior Publication Data
US 2025/0023799 A1    Jan. 16, 2025

(30) Foreign Application Priority Data
Jul. 11, 2023   (IN) .............. 202311046506

(51) Int. Cl.
| | | |
|---|---|---|
| G06F 15/173 | (2006.01) | |
| G08G 5/26 | (2025.01) | |
| H04L 41/50 | (2022.01) | |

(52) U.S. Cl.
CPC .............. H04L 41/50 (2013.01); G08G 5/26 (2025.01)

(58) Field of Classification Search
None
See application file for complete search history.

(56) References Cited

U.S. PATENT DOCUMENTS

| | | | |
|---|---|---|---|
| 6,246,320 B1 * | 6/2001 | Monroe .......... | G08B 13/19645 342/36 |
| 7,876,259 B2 * | 1/2011 | Schuchman .......... | G07C 5/008 342/36 |

(Continued)

FOREIGN PATENT DOCUMENTS

| | | |
|---|---|---|
| CN | 113660718 A | 11/2021 |
| EP | 3330732 A1 | 6/2018 |

OTHER PUBLICATIONS

Extended European Search Report Mailed on Jan. 7, 2025 for EP Application No. 24183002, 7 page(s).

(Continued)

*Primary Examiner* — Phuoc H Nguyen
(74) *Attorney, Agent, or Firm* — ALSTON & BIRD LLP (57) ABSTRACT

Methods, systems, computing devices, and/or the like are provided. According to various embodiments, method for monitoring communications between an in-air communication system and a ground-based communication system may include storing one or more messages received from the in-air communication system or the ground-based communication system; monitoring a transaction between the ground-based communication system and the in-air communication system; tracking a plurality of metadata related to the one or more messages, storing the plurality of metadata; determining, based at least in part on the plurality of metadata, one or more performance indicators, wherein the one or more performance indicators comprise percentages of the one or more messages sent from the in-air communication system to the ground-based communication system that fail to meet a plurality of performance benchmarks; and outputting at least the one or more percentages.

20 Claims, 7 Drawing Sheets

(56) References Cited

U.S. PATENT DOCUMENTS

| | | | |
|---|---|---|---|
| 8,369,966 B2 | 2/2013 | Holzaepfel et al. | |
| 10,078,644 B1* | 9/2018 | Newman | H04N 1/2158 |
| 10,538,338 B2 | 1/2020 | Lacroix et al. | |
| 12,008,046 B1* | 6/2024 | Curtis | G06F 16/90335 |
| 2008/0316057 A1 | 12/2008 | McGuffin | |
| 2014/0325649 A1* | 10/2014 | Zhang | H04L 43/026 |
| | | | 726/23 |
| 2016/0112822 A1* | 4/2016 | Giral | H04L 41/0823 |
| | | | 455/414.1 |
| 2017/0141989 A1* | 5/2017 | Sufleta | H04L 47/125 |
| 2018/0155052 A1* | 6/2018 | Lacroix | G08G 5/0013 |
| 2018/0337719 A1* | 11/2018 | McGuffin | H04B 7/18508 |
| 2019/0104437 A1* | 4/2019 | Bartfai-Walcott | |
| | | | H04W 28/0231 |
| 2020/0250993 A1* | 8/2020 | Li | G08G 5/32 |
| 2022/0108262 A1* | 4/2022 | Cella | G06Q 10/063118 |
| 2022/0215765 A1* | 7/2022 | Gupta | G08G 5/0013 |
| 2023/0205836 A1* | 6/2023 | Brannon | G06F 21/6218 |
| | | | 715/234 |
| 2023/0275973 A1* | 8/2023 | Sakamoto | H04L 41/22 |
| | | | 709/224 |

OTHER PUBLICATIONS

Icao, "Doc 9869 Performance-based Communication and Surveillance (PBCS) Manual, Second Edition, 2017", retrieved from the Internet at URL: <https://news.mcaa.gov.mn/uploads/bookSubject/2022-11/637c7dc7a8c70.pdf> on Jan. 29, 2025, 212 pages.

* cited by examiner

| LEG | DATE | ADS-C Messages | CPDLC Messages |
|---|---|---|---|
| LEGL-IG-IPN | 25-Aug-2022 | 48 | 8 |
| KMOT-LEGL | 24-Aug-2022 | 48 | 7 |

| LEG | Timestamp | Type | Position | FIR | Communication | Duration Second | PORT Second | Network Second |
|---|---|---|---|---|---|---|---|---|
| LEGL-IG-IPN | 8/25/22 17:40:15 | CPDLC | | NEW YORK OCEANIC FIR | Satellite | 40 | 13 | 7 |
| LEGL-IG-IPN | 8/25/22 17:40:15 | ADS-C | N4222342 W330-6 | NEW YORK OCEANIC FIR | VHF | 22 | N/A | N/A |
| LEGL-IG-IPN | 8/25/22 17:40:15 | ADS-C | N4222342 W330-6 | NEW YORK OCEANIC FIR | VHF | 2 | N/A | N/A |
| LEGL-IG-IPN | 8/25/22 17:40:15 | ADS-C | N4222342 W330-6 | NEW YORK OCEANIC FIR | Satellite | 6 | N/A | N/A |
| LEGL-IG-IPN | 8/25/22 17:40:15 | ADS-C | N4222342 W330-6 | NEW YORK OCEANIC FIR | Satellite | 6 | N/A | N/A |
| LEGL-IG-IPN | 8/25/22 17:40:15 | CPDLC | | NEW YORK OCEANIC FIR | Satellite | 22 | 11.5 | 10.5 |
| LEGL-IG-IPN | 8/25/22 17:40:15 | CPDLC | | NEW YORK OCEANIC FIR | Satellite | 22 | 15 | 7 |
| LEGL-IG-IPN | 8/25/22 17:40:15 | ADS-C | N4222342 W330-6 | NEW YORK OCEANIC FIR | Satellite | 6 | N/A | N/A |
| LEGL-IG-IPN | 8/25/22 17:40:15 | ADS-C | N4222342 W330-6 | NEW YORK OCEANIC FIR | Satellite | 5 | N/A | N/A |
| LEGL-IG-IPN | 8/25/22 17:40:15 | ADS-C | N4222342 W330-6 | NEW YORK OCEANIC FIR | Satellite | 6 | N/A | N/A |
| LEGL-IG-IPN | 8/25/22 17:40:15 | ADS-C | N4222342 W330-6 | NEW YORK OCEANIC FIR | Satellite | 6 | N/A | N/A |
| LEGL-IG-IPN | 8/25/22 17:40:15 | ADS-C | N4222342 W330-6 | NEW YORK OCEANIC FIR | Satellite | 6 | N/A | N/A |
| LEGL-IG-IPN | 8/25/22 17:40:15 | ADS-C | N4222342 W330-6 | NEW YORK OCEANIC FIR | Satellite | 7 | N/A | N/A |
| LEGL-IG-IPN | 8/25/22 17:40:15 | ADS-C | N4222342 W330-6 | NEW YORK OCEANIC FIR | Satellite | 6 | N/A | N/A |
| LEGL-IG-IPN | 8/25/22 17:40:15 | ADS-C | N4222342 W330-6 | NEW YORK OCEANIC FIR | Satellite | 6 | N/A | N/A |
| LEGL-IG-IPN | 8/25/22 17:40:15 | ADS-C | N4222342 W330-6 | NEW YORK OCEANIC FIR | Satellite | 6 | N/A | N/A |
| LEGL-IG-IPN | 8/25/22 17:40:15 | ADS-C | | NEW YORK OCEANIC FIR | | 000 | N/A | N/A |
| LEGL-IG-IPN | 8/25/22 17:40:15 | ADS-C | N4222342 W330-6 | NEW YORK OCEANIC FIR | Satellite | 6 | N/A | N/A |
| LEGL-IG-IPN | 8/25/22 17:40:15 | ADS-C | N4222342 W330-6 | SANTAMARIA OCEANIC FIR | Satellite | 29 | N/A | N/A |
| LEGL-IG-IPN | 8/25/22 17:40:15 | ADS-C | N4222342 W330-6 | SANTAMARIA OCEANIC FIR | Satellite | 14 | N/A | N/A |
| LEGL-IG-IPN | 8/25/22 17:40:15 | ADS-C | N4222342 W330-6 | SANTAMARIA OCEANIC FIR | Satellite | 52 | N/A | N/A |
| LEGL-IG-IPN | 8/25/22 17:40:15 | ADS-C | N4222342 W330-6 | SANTAMARIA OCEANIC FIR | VHF | 15 | N/A | N/A |
| LEGL-IG-IPN | 8/25/22 17:40:15 | ADS-C | N4222342 W330-6 | SANTAMARIA OCEANIC FIR | VHF | 4 | N/A | N/A |
| LEGL-IG-IPN | 8/25/22 17:40:15 | ADS-C | N4222342 W330-6 | SANTAMARIA OCEANIC FIR | VHF | 4 | N/A | N/A |
| LEGL-IG-IPN | 8/25/22 17:40:15 | ADS-C | N4222342 W330-6 | SANTAMARIA OCEANIC FIR | VHF | 6 | N/A | N/A |
| LEGL-IG-IPN | 8/25/22 17:40:15 | ADS-C | | SANTAMARIA OCEANIC FIR | VHF | 20 | 14.5 | 3.5 |
| LEGL-IG-IPN | 8/25/22 17:40:15 | ADS-C | N4222342 W330-6 | SANTAMARIA OCEANIC FIR | VHF | 3 | N/A | N/A |
| LEGL-IG-IPN | 8/25/22 17:40:15 | ADS-C | N4222342 W330-6 | SANTAMARIA OCEANIC FIR | Satellite | 14 | N/A | N/A |
| LEGL-IG-IPN | 8/25/22 17:40:15 | ADS-C | N4222342 W330-6 | SANTAMARIA OCEANIC FIR | VHF | 44 | N/A | N/A |
| LEGL-IG-IPN | 8/25/22 17:40:15 | ADS-C | N4222342 W330-6 | SANTAMARIA OCEANIC FIR | VHF | 1 | N/A | N/A |

| 95% RSP 180 benchmark | 99.9% RSP 180 benchmark | 95% RSP 240 benchmark | 99.9% RSP 240 benchmark |
|---|---|---|---|
| 100% | 100% | 75% | 75% |
| %91.3 | 97.4% | 71.4% | 71.4% |
| SITA Only | | | |
| ASP <= 90 sec ▼ | ASP <= 180 sec ▼ | ACP <= 180 sec ▼ | ACP <= 210 sec ▼ |
| N/A | N/A | N/A | Pass |
| Pass | Pass | N/A | N/A |
| Pass | Pass | N/A | N/A |
| Pass | Pass | N/A | N/A |
| Pass | Pass | N/A | N/A |
| N/A | N/A | Pass | Pass |
| N/A | N/A | Pass | Pass |
| Pass | Pass | N/A | N/A |
| Pass | Pass | N/A | N/A |
| Pass | Pass | N/A | N/A |
| Pass | Pass | N/A | N/A |
| Pass | Pass | N/A | N/A |
| Pass | Pass | N/A | N/A |
| Pass | Pass | N/A | N/A |
| Pass | Pass | N/A | N/A |
| Pass | Pass | N/A | N/A |
| N/A | N/A | Fail | Fail |
| Pass | Pass | N/A | N/A |
| Pass | Pass | N/A | N/A |
| Pass | Pass | N/A | N/A |
| Pass | Pass | N/A | N/A |
| Pass | Pass | N/A | N/A |
| Pass | Pass | N/A | N/A |
| Pass | Pass | N/A | N/A |
| Pass | Pass | N/A | N/A |
| N/A | N/A | Pass | Pass |
| Pass | Pass | N/A | N/A |
| Pass | Pass | N/A | N/A |
| Pass | Pass | N/A | N/A |
| Pass | Pass | N/A | N/A |

FROM FIG. 3A

SYSTEMS, METHODS, AND APPARATUSES FOR PERFORMANCE-BASED COMMUNICATION SURVEILLANCE (PBCS) MONITORING

CROSS-REFERENCE TO RELATED APPLICATIONS

This application claims the benefit of Indian Provisional Application No. 20/2311046506, filed Jul. 11, 2023, and entitled "SYSTEMS, METHODS, AND APPARATUSES FOR PERFORMANCE-BASED COMMUNICATION SURVEILLANCE (PBCS) MONITORING," which is incorporated by reference herein in its entirety.

TECHNICAL FIELD

The present disclosure relates generally to performance-based communication and surveillance (PBCS). In particular, it relates to monitoring, analyzing, and providing real-time measurements to assess a pilot's communication performance, surveillance performance, and pilot-operational response time.

BACKGROUND

Aircraft personnel are often required to meet one or more performance benchmarks. Under certain standards, to remain certified, an aircraft's personnel must report location information and must respond to communications within set time frames a certain percentage of the time. Failure to meet these benchmarks may result in inefficiencies, loss of certification, and/or the like.

Compounding the problem is the fact that performance data are not available after an aircraft completes a trip. Aircraft personnel may have to wait months before knowing whether or not they are meeting the performance benchmarks, and, by that point, it may be too late to adjust their performance to meet the benchmark.

Through applied effort, ingenuity, and innovation, Applicant has solved problems relating to real-time reporting of aircraft performance by developing solutions embodied in the present disclosure, which are described in detail below.

SUMMARY

In general, embodiments of the present disclosure provide methods, systems, and/or the like.

In accordance with various embodiments of the present disclosure, there is provided a method for monitoring communications between an in-air communication system and a ground-based communication system, the method including storing one or more messages received from the in-air communication system or the ground-based communication system; storing the plurality of metadata; determining, based at least in part on the plurality of metadata, one or more performance indicators, wherein the one or more performance indicators include percentages of the one or more messages sent from the in-air communication system to the ground-based communication system that fail to meet one or more performance benchmarks; and outputting at least the one or more percentages.

In some embodiments, the method includes updating the transaction between the ground-based communication system and the in-air communication system.

In some embodiments, the one or more messages are one or more of geographic location coordinates.

In some embodiments, the one or more messages are one or more communications.

In some embodiments, the one or more performance benchmarks include a benchmark for required communication performance criteria and a benchmark for required surveillance performance criteria.

In some embodiments, the required communication performance is determined using CPDLC Message Transactions and the required surveillance performance is determined using ADS-C Message Transactions.

In some embodiments, the one or more percentages include a first percentage and a second percentage, and wherein the method further includes determining the first percentage of the one or more messages sent from the in-air communication system to the ground-based communication system that fail to meet the benchmark for the required communication performance criteria and the second percentage of the one or more messages that include geographic location coordinates that fail to meet the benchmark for the required surveillance performance criteria.

In some embodiments, the method further includes triggering an alarm if one or more of first percentage or the second percentage fail to exceed the required communication performance criteria or the required surveillance performance criteria.

In some embodiments, the plurality of metadata include: a plurality of timestamps indicating, for each of the one or more messages, when the in-air communication system or the ground-based communication system received or sent the one or more messages; a first value indicating the one or more messages sent from the in-air communication system to the ground-based communication system; and a second value indicating the one or more messages sent from the ground-based communication system to the in-air communication system; a third value indicating the one or more messages that include geographic location coordinates; and a fourth value indicating the one or more messages that include a communication.

In some embodiments, the one or more percentages include a first percentage including the percentage of the first value that fail to meet the benchmark for the required communication performance criteria; and a second percentage including the percentage the second value that fail to meet the benchmark for the required communication performance criteria; and wherein the method further includes: rendering one or more user interface elements displaying one or more of: the one or more timestamps; the first value; the second value; the third value; the fourth value; the first percentage; and the second percentage.

In some embodiments, the method further includes determining a pilot operational response time (PORT) based on the one or more performance benchmarks.

According to various embodiments, there is provided a system for monitoring communications between an in-air communication system and a ground-based communication system, the system including: a database; a data center; and a processor, wherein the database is configured to store one or more message received from the in-air communication system or the ground-based communication system and to store a plurality of metadata related to the one or more messages, and wherein the processor is configured to track the plurality of metadata related to the one or more messages and to determine one or more percentages of the one or more messages sent from the in-air communication system to the ground-based communication system that fail to meet one or more performance benchmarks.

In some embodiments, the data center is further configured to initiate and update a transaction between the ground-based communication system and the in-air communication system.

In some embodiments, the one or more messages include one or more of geographic location coordinates or a communication.

In some embodiments, the one or more performance benchmarks include a benchmark for required communication performance criteria and a benchmark for required surveillance performance criteria.

In some embodiments, the processor is further configured to determine the required communication performance using CPDLC Message Transactions and the required surveillance performance using ADS-C Message Transactions.

In some embodiments, the one or more percentages include a first percentage and a second percentage, and wherein the processor is further configured to determine the first percentage of the one or more messages sent from the in-air communication system to the ground-based communication system that fail to meet the benchmark for the required communication performance criteria and the second percentage of the one or more messages that include geographic location coordinates that fail to meet the benchmark for the required surveillance performance criteria.

In some embodiments, the processor is further configured to trigger an alarm if one or more of first percentage or the second percentage fail to exceed the required communication performance criteria or the required surveillance performance criteria.

In some embodiments, the plurality of metadata includes: a plurality of timestamps indicating, for each of the one or more messages, when the in-air communication system or the ground-based communication system received or sent the one or more messages; a first value indicating the one or more messages sent from the in-air communication system to the ground-based communication system; and a second value indicating the one or more messages sent from the ground-based communication system to the in-air communication system; a third value indicating the one or more messages that include geographic location coordinates; and a fourth value indicating the one or more messages that include a communication.

In some embodiments, the one or more percentages include a first percentage including the percentage of the first value that fail to meet the benchmark for the required communication performance criteria; and a second percentage including the percentage the second value that fail to meet the benchmark for the required communication performance criteria; and wherein the processor is further configured to render one or more user interface elements displaying one or more of: the one or more timestamps; the first value; the second value; the third value; the fourth value; the first percentage; and the second percentage.

In accordance with another aspect of the disclosure, an apparatus is provided. The apparatus includes at least one processor and at least one memory having computer-coded instructions stored thereon that, in execution with the at least one processor, causes the apparatus to perform any one of the example methods described herein.

In accordance with another aspect of the disclosure, a computer program product is provided. The computer program product includes at least one non-transitory computer-readable storage medium having computer program code stored thereon that, in execution with at least one processor, configures the computer program product to perform any one of the example methods described herein.

The above summary is provided merely for purposes of summarizing some example embodiments to provide a basic understanding of some embodiments of the disclosure. Accordingly, it will be appreciated that the above-described embodiments are merely examples. It will be appreciated that the scope of the disclosure encompasses many potential embodiments in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIGS. 3A and 3B illustrate an example monitoring report from an example PBCS system in accordance with at least some example embodiments of the present disclosure;

DETAILED DESCRIPTION OF SOME EXAMPLE EMBODIMENTS

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one embodiment of the present disclosure and may be included in more than one embodiment of the present disclosure (importantly, such phrases do not necessarily may refer to the same embodiment).

Overview

The following discloses various embodiments for providing real-time reporting on the surveillance and communication performance of aircraft and their personnel so that timely actions may be taken to address any personnel or aircraft systems that fail to meet performance benchmarks and could potentially result in a loss of certification. Certification authorities may take up to six months to collect data on an aircraft's performance and can take even longer to provide a report on that performance to the aircraft's personnel; hence, without real-time reporting on performance, aircraft personnel may not have an accurate understanding of whether or not they are meeting certain performance benchmarks.

According to various embodiments, communication performance, surveillance performance, and pilot operational response time (PORT) may each be measured and reported in real time. In some embodiments, communication performance ma be measured using the total transaction time between air traffic control (ATC) uplink time and pilot downlink response time. In some embodiments, surveillance performance may be measured using the time taken for the automatic dependent surveillance-contract (ADS-C) downlink report to reach an ATC ground server. In some embodiments, PORT may be determined by associating the controller pilot datalink communication (CPDLC) uplink and downlinks and then identifying and subtracting any network delays.

According to various embodiments, surveillance and communication performance data may be provided to aircraft personnel in a variety of ways, including as a document, in a spreadsheet, or by a graphical user interface. In some embodiments, aircraft personnel or ground crews may be alarmed in real time by a message sent from the ground-based communication system to the aircraft, notifying aircraft personnel when their communications are not in compliance with a relevant performance benchmark. Aircraft personnel may need real-time alarms/notifications in various situations, including (but not limited to) when there is a consistent and very high delay for aircraft messages to reach the ground and/or there is a high delay between ATC's uplink and aircraft personnel downlink time.

Example PBCS Systems

Figure 1A:
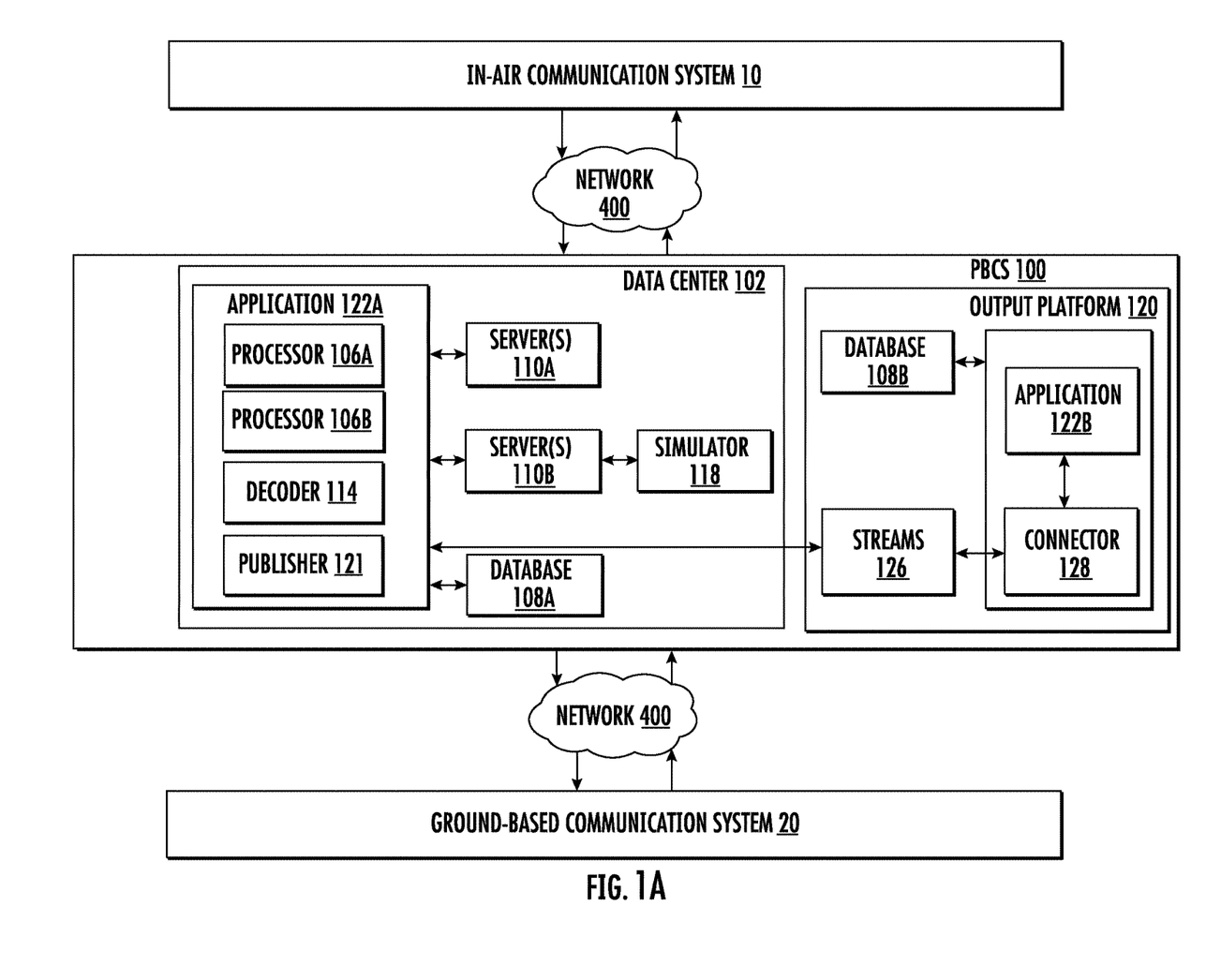
FIG. 1A illustrates an example system architecture of an example PBCS system in accordance with at least some example embodiments of the present disclosure.
Figure 1B:
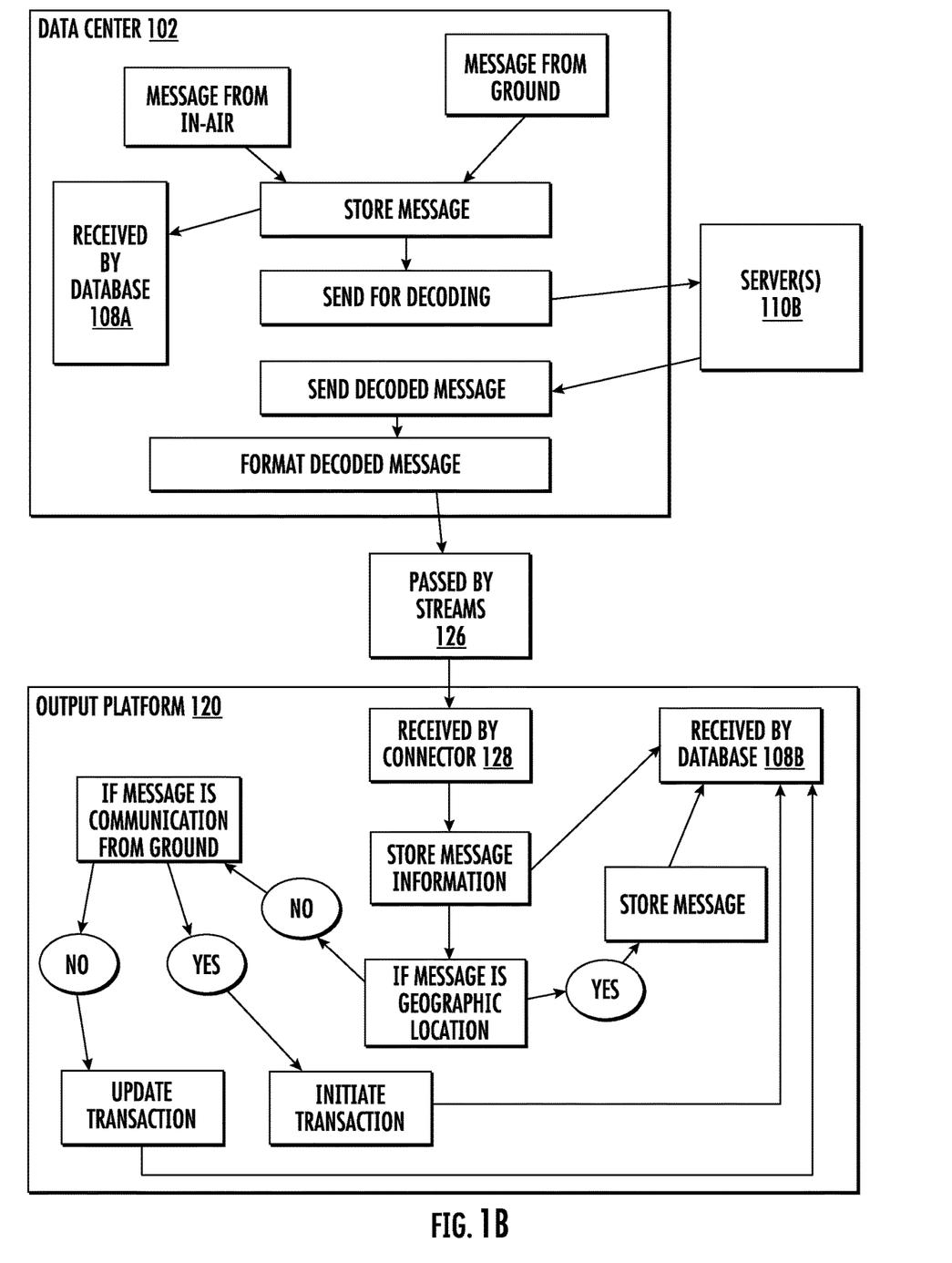
FIG. 1B illustrates an example data flow and algorithm in accordance with at least some example embodiments of the present disclosure.

FIG. 1 shows an example system architecture of an example PBCS system 100, according to various embodiments, and FIG. 1B illustrates an example data flow and algorithm in accordance with at least some example embodiments of the present disclosure. It will be understood that the data flow shown in FIG. 1B may be implemented by the system architecture of the PBCS system 100 shown in FIG. 1A. It will also be understood that the data flow may also be performed by various other suitable systems, as desired.

In some embodiments, the PBCS system 100 may be configured to monitor communications between an in-air communication system 200 and a ground-based communications system 300.

In some embodiments, the in-air communication system 200 may include one or more devices configured short-range and/or long-distance radio communication at a range of frequencies. The in-air communication system 10 may be configured to send and/or receive one or more messages to/from the ground-based communication system 300. In some embodiments, messages sent from the in-air communication system 200 to the ground-based communication system 300 may be referred to as a downlink communication. The one or more messages sent from the in-air communication system 200 to the ground-based communication system 300 may be a communication such a DataLink communication including a textual message, such as one updating the status of the aircraft or the aircraft personnel. In some embodiments, the one or more messages sent from the in-air communication system 200 the ground-based communication system 300 may be a geographic location, such as a waypoint including geographic coordinates, the aircraft's bearing, and/or the aircraft's distance from another location (e.g., an airport, another waypoint, and/or the like.).

In some embodiments, the ground-based communication system 300 may be an air traffic control (ATC) configured to communicate at various ranges and various frequencies with one or more aircraft and aircraft personnel. The ground-based communication system 300 may be configured to send and/or receive one or more messages to/from the ground-based communication system 300. The one or more messages may be, as previously described, a communication or a geographic location. It will be understood that the ground-based communication system 300 is generally configured to receive a geographic location message, not to send one. In some embodiments, the ground-based communication system 300 may be configured to send one or more messages to the in-air communication system 200 requesting a response and/or requesting geographic location.

In some embodiments, PBCS system 100 may be configured to provide real time reporting on whether an aircraft is meeting certain performance benchmarks. To achieve this, the PBCS 100 can monitor, initiate, and/or update an exchange of one or more messages between the in-air communication system 200 and the ground-based communications system 300. The one or more messages may be messages as previously described (i.e., a communication or a geographic location). In some embodiments, the exchange may be referred to as a transaction. Either the in-air communication system 200 or the ground-based communication system 300 may send a message to the other to initiate a transaction. In some embodiments, and as shown in at least FIG. 1B, the message may be either a message containing a geographic location (also known as an ADS-C message) of the aircraft or a message containing a communication (also known as a CPDLC message) from the in-air communication system 200 to the ground-based communication system 300, or vice-versa.

In some embodiments, and as previously mentioned, the PBCS 100 may be configured to determine whether or not an aircraft and its personnel are meeting performance benchmarks. In some embodiments, the performance benchmarks may be met based on whether or not the aircraft sends the one or more messages within certain time frames (e.g., the in-air communication system 200 responding to one or more messages from the ground-based communication system 300). In some embodiments, the performance benchmarks may include required surveillance performance (RSP), required communication performance (RCP), and/or pilot operational response time (PORT). In some embodiments, RSP certification requires the one or more messages to be sent within 90 seconds 95% of the time and 180 seconds 99.9% of the time. In some embodiments, RCP may require the one or more messages to be sent within 180 seconds 95% of the time and 240 seconds 99.9% of the time. In some embodiments, PORT may be determined based on the time taken by aircraft personnel to respond to any communications from the ground-based communication system 300, not including any network delays; in some embodiments, PORT certification may require response time of less than 60 seconds to messages from ATC. In some embodiments, and as will be described in detail later in this disclosure, if an aircraft and its personnel are not meeting the one or more performance benchmarks, the PBCS system 100 may be configured to generate a report upon completion or shortly after completion of the flight indicating to the aircraft personnel whether they met the performance benchmarks. In some embodiments, the PBCS system 100 may further be configured to create an alert or similar alarm for the aircraft personnel during flight in order to provide real-time feedback that detected operational data associated with performance of a particular flight indicates failure to meet one or more performance benchmarks.

In some embodiments, once the one or more messages are sent, the one or more messages may be monitored by the PBCS system 100. In some embodiments, the PBCS system 100 may include a data center 102 configured to track the one or more messages. The data center 102 can include one or more components configured to monitor, initiate, and/or update a transaction of one or more messages between the in-air communication system 200 and the ground-based communication system 300. In some embodiments, the PBCS system 100 may include a database 108A configured to store the one or more messages. In some embodiments, the database 108A may be located within the data center 102. In some embodiments, the database 108A may be an online transaction processing (OLTP) database configured to store and allow access to one or more messages.

In some embodiments, one or more components of the PBCS system 100 may be housed (physically or virtually) within the data center 102. In some embodiments, the PBCS system 100 may include one or more servers 110A, 110B, which may be located within the data center 102 as shown in at least FIG. 1A. The servers 110A, 110B may be physically located within the data center 102 or may be virtual servers. In some embodiments, the servers 110A, 110B may be configured to interact with an application 122A and one or more processors 106A, 106B located within the application 122A. In some embodiments, the application 122A may be a DataLink application.

In some embodiments, the one or more processors 106A, 106B may be configured to process the one or more messages sent from the in-air communication system 200 and/or the ground-based communication system 300. In some embodiments, a processor (e.g., a particular processor 106A or sub-component thereof) may be configured to process downlink communications (i.e., communications from the in-air communication system 200 to the ground-based communication system 300) and another processor (e.g., processor 106B or sub-component thereof) may be configured to process uplink communications (i.e., communications from the ground-based communication system 300 to the in-air communication system 200).

In some embodiments, the PBCS system 100 may include a decoder 114 configured to decode the one or more messages. In some embodiments, the decoder 114 may be housed within the application 122A. In some embodiments, once the message has been decoded by the decoder 114, it may be output to a server (e.g., server 110B), which may then send the message to a simulator 118. In some embodiments, the simulator 118 may be an "Airsim," which may be simulating the aircraft with the in-air communication system 200, and the simulation may be updated based on the decoded message.

In some embodiments, the processors 106A and/or 106B, and/or the decoder 114, may be configured to track a plurality of metadata associated with the message. The PBCS system 100 may track (using at least the aforementioned components) a variety of metadata. According to various embodiments, the metadata may include a plurality of timestamps, a first value indicating the one or more messages sent from the in-air communication system 200 to the ground-based communication system 300 (i.e., downlink messages), a second value indicating the one or more messages sent from the ground-based communication system 300 to the in-air communication system 200 (i.e., uplink messages).

In some embodiments, the PBCS system 100 may include a publisher 121. In some embodiments, the publisher 121 may be housed within the Application 122A. The publisher 121 may be configured to output the message to an output platform 120. In some embodiments, the publisher 121 may be configured to output the one or more messages to the output platform 120.

In some embodiments, the PBCS system 100 may include the output platform 120. The output platform 120 may be configured to provide the message to a consumer; that is, the output platform 120 may be configured for users of the PBCS system 100 to provide them with the messages after the message has passed through the data center 102 (i.e., after the message has been decoded). In some embodiments, the output platform 120 may be enterprise software (e.g., FORGE) configured to provide functionality for data analysis, such as the metadata of the messages. In some embodiments, the output platform may include a stream 126 that can connect to the connector 128, each of which may be configured to surface the messages and/or metadata on the output platform 120. In some embodiments, the output platform 120 may include a database 108B. In some embodiments, the database 108B may be a DBaaS database. In some embodiments, the database 108B may be configured to store the decoded message and/or the metadata.

Referring again to FIG. 1B, after the message has been sent to the output platform 120, and as previously mentioned, it may be stored in the database 108B. Before the message is determined to be a communication or a geographic location, the message may be stored in the database 108B. If the message is determined to be a geographic location, it may be updated in the database 108B as such. If the message is determined to be a communication from the ground-based communication system 300 to the in-air communication system 200, it may similarly be updated as such in the database 108B, and further a transaction may be initiated to monitor, among other things, the time it takes for the in-air communication system 200 to send a message in reply. If the message is determined to be a communication from the in-air communication system 200 to the ground-based communication system 300, it may be updated as such in the database 108B, and further the transaction between the in-air communication system 200 and the ground-based communication system 300 may be updated (i.e., updated to reflect that the in-air communication system 200 has responded).

Figure 3B:
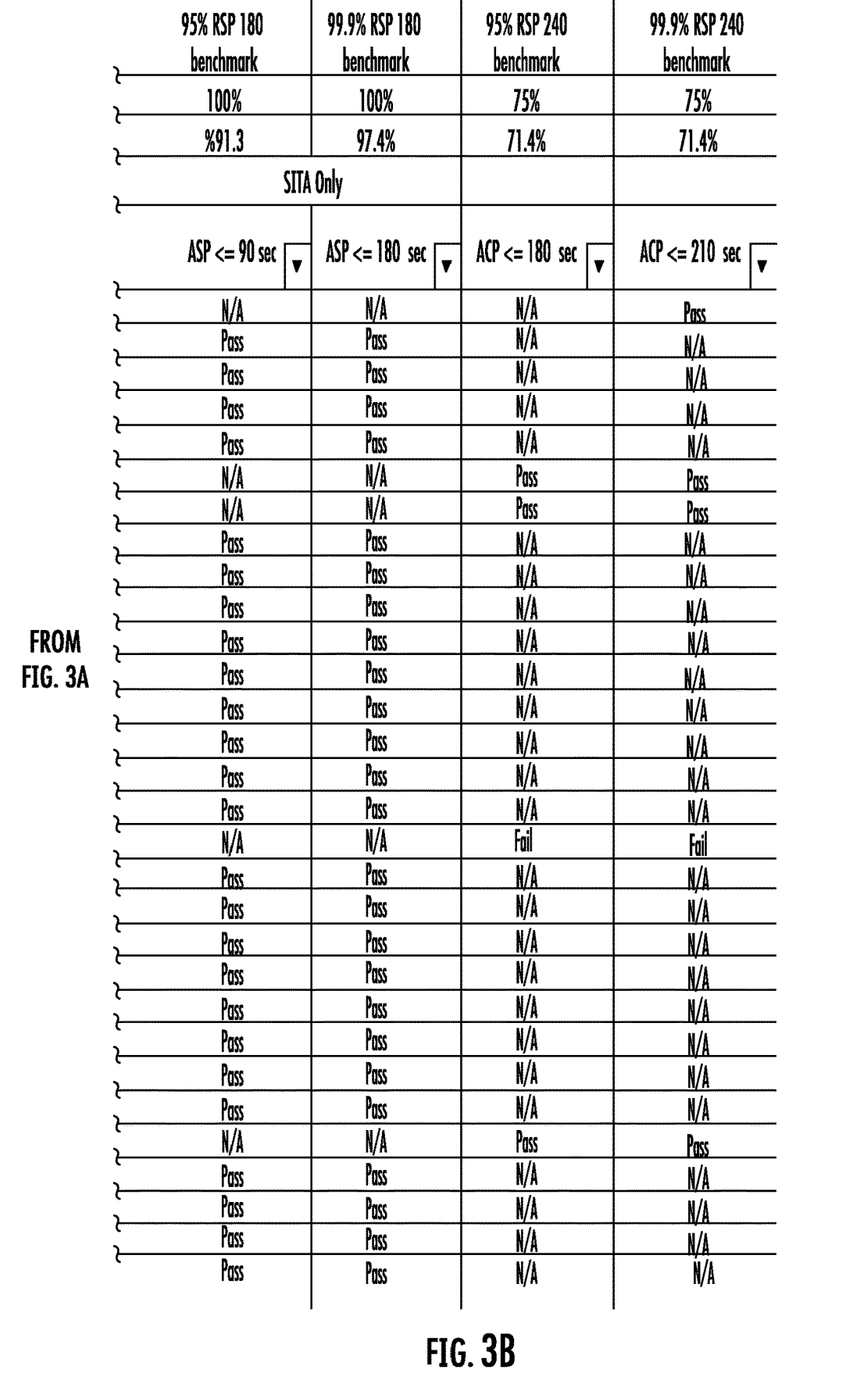
Figure 4:
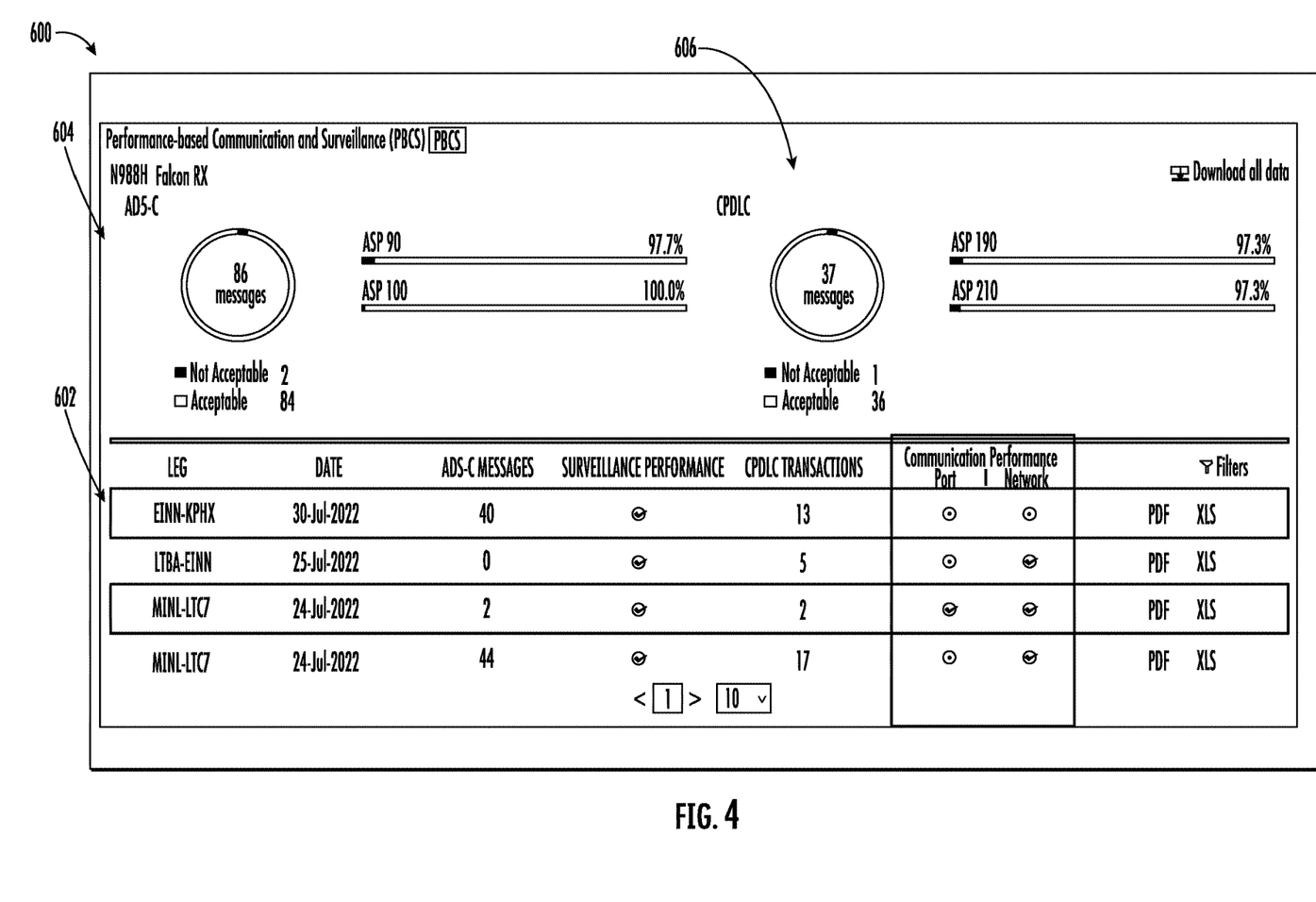
FIG. 4 illustrates an example user interface from an example PBCS system in accordance with at least some example embodiments of the present disclosure.

The PBCS system 100, as previously discussed to, may be configured to generate various outputs and surface them to the output platform 120. In some embodiments the outputs may be generated by the data center 102, various components of the data center 102 (e.g., processors 106A-B, decoder 114, publisher 120), and/or various components of the output platform 120 (e.g., streams 126, connector 128, or the application 122B. In some embodiments, the application 122B may be a DataLink application, similar to the application 122A, and executed on the output platform 120. Example outputs can be seen in at least FIGS. 3A, 3B, and 4. FIG. 3 shows an example table output 500 and FIG. 4 shows an example GUI output 600. It will be understood that these outputs are examples only and that different formats may be provided to users, as desired.

As shown in at least FIGS. 3A and 3B, the table output 500 may include a list of the one or more messages. In some embodiments, the table output 500 may include various identification information, including the report number, an alphanumeric, and the period of time from which data is utilized to produce values in the report (in this example, Aug. 24, 2022 to Aug. 26, 2022). The table output 500 may further include a variety of metadata associated with the one or more messages and/or the transaction associated with the one or more messages. As shown in at least FIGS. 3A and 3B, the metadata may include the leg on which the flight leg, the timestamp, what type of message (CPDLC or ADS-C), the position (in embodiments where the message is ADS-C), the FIR, the type of communication (e.g., satellite, VHF), the message duration (in seconds), the pilot operational response time (in seconds), and/or the network delay (in seconds). In some embodiments, the table output 500 may further indicate whether the one or more messages pass the one or more performance benchmarks. In some embodiments, the table output 500 may indicate actual surveillance performance (ASP) and actual communication performance (ACP).

In some embodiments, the table output 500 may include one or more summaries/analyses of the one or more messages and their associated transactions. For example, as shown in FIGS. 3A and 3B, the table output 500 includes a summary section 502, which as depicted is broken down by flight leg. The summary section 502 further includes the date of the flight leg, the number of ADS-C messages (geographic locations) and CPDLC messages (communications). Referring to LEG LEEL-KHPN, 48 ADS-C messages were sent and 8 CPDLC messages were sent. In some embodiments, the summary may include the one or more percentages showing the percentage of the one or more messages that met the one or more performance benchmarks. In this particular example, 100% of the ADS-C messages met the 95% RSP 180 performance benchmark, and 100% of the ADS-C messages met the 99.9% RSP 180 benchmark. That is, 100% of the ADS-C messages were sent within 90 seconds (and, by extension, 100% were sent within 180 seconds). In some embodiments, there may be visual indicators (e.g., green highlighting) to show that the performance benchmarks were met. It will be appreciated that in other contexts, any other defined performance benchmark may be utilized.

Referring now to FIG. 4, in some embodiments, the GUI output 600 may include a table of values 602, similar to the table output 500 in FIG. 4, but with a more consolidated and streamlined presentation of the information. In some embodiments, the GUI output 600 may include an element 604 showing the number of ADS-C messages that met a performance benchmark ("Acceptable") and those that did not ("Not Acceptable"), and the GUI output 600 may be further configured to present, as an element, the number of acceptable and, as another element, the number of not acceptable messages as values and, as another element, a percentage of total messages sent (in this example, 86) and/or as a chart (in this case, a pie chart). In some embodiments, the GUI output 600 may include an element 606 showing the number of CPDLC messages that met a performance benchmark, similar to the element 604 for ADS-C messages. It will be understood that the GUI output 600 may include additional elements showing other performance benchmarks, as desired. For example, the GUI 600 may give a simple visual indicator (e.g., a red "X") for when a performance benchmark is not met. In the particular example shown in FIG. 4, the aircraft and personnel on LEG EINN-KPHX, on Jul. 30, 2022, did not pass a communication performance benchmark (e.g., the RCP benchmark), but it did pass a surveillance performance benchmark (e.g., the RSP benchmark). The GUI 600 may additionally or alternatively have functionality enabling users to download the output in various formats (e.g., PDF, XLS). In some embodiments, the output available for download may represent or otherwise be similar to the table 500 as shown in FIGS. 3A and 3B.

It will be understood that the various components of the PBCS system 100 that have been described as being located within the data center 102, the output platform 120, and/or the applications 122A, 122B may be arranged within the PBCS system 100 so as not to be housed within those components, as desired. It will further be understood that the PBCS system 100 may not include some of the components described herein, and instead the components may be housed within other systems and accessed externally by the PBCS system 100 as needed.

In some embodiments, the PBCS 100 may wirelessly communicate with one or more of the in-air communication system 200 via a communications network 400. According to various embodiments, the communications network 400 may be embodied in myriad network configurations. In some embodiments, the communications network 400 may be a dedicated network 400. In some embodiments, the communications network 400 is a public network (e.g., the Internet). In some embodiments, the communications network 400 is a private network (e.g., an internal, localized, or closed-off network between particular devices). In some embodiments, the communications network 400 is a hybrid network (e.g., a network enabling internal communications between particular connected devices and external communications with other devices). The communications network 400 in some embodiments includes one or more base station(s), relay(s), router(s), switch(es), cell tower(s), communications cable(s) and/or associated routing station(s), and/or the like. In some embodiments, the communications network 400 includes one or more user controlled computing device(s) (e.g., a user owner router and/or modem) and/or one or more external utility devices (e.g., Internet service provider communication tower(s) and/or other device(s)).

In some embodiments, each of the components of the system 100 may be communicatively coupled to transmit data to and/or receive data from one another over the same or different wireless or wired networks embodying the communications network 400. Such configuration(s) include, without limitation, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities communicating over the communications network 400, the various embodiments are not limited to this particular architecture. In other embodiments, one or more computing entities share one or more components, hardware, and/or the like, or otherwise are embodied by a single computing device such that connection(s) between the computing entities are over the communications network 400 are altered and/or rendered unnecessary.

Example PBCS Apparatus

Figure 2:
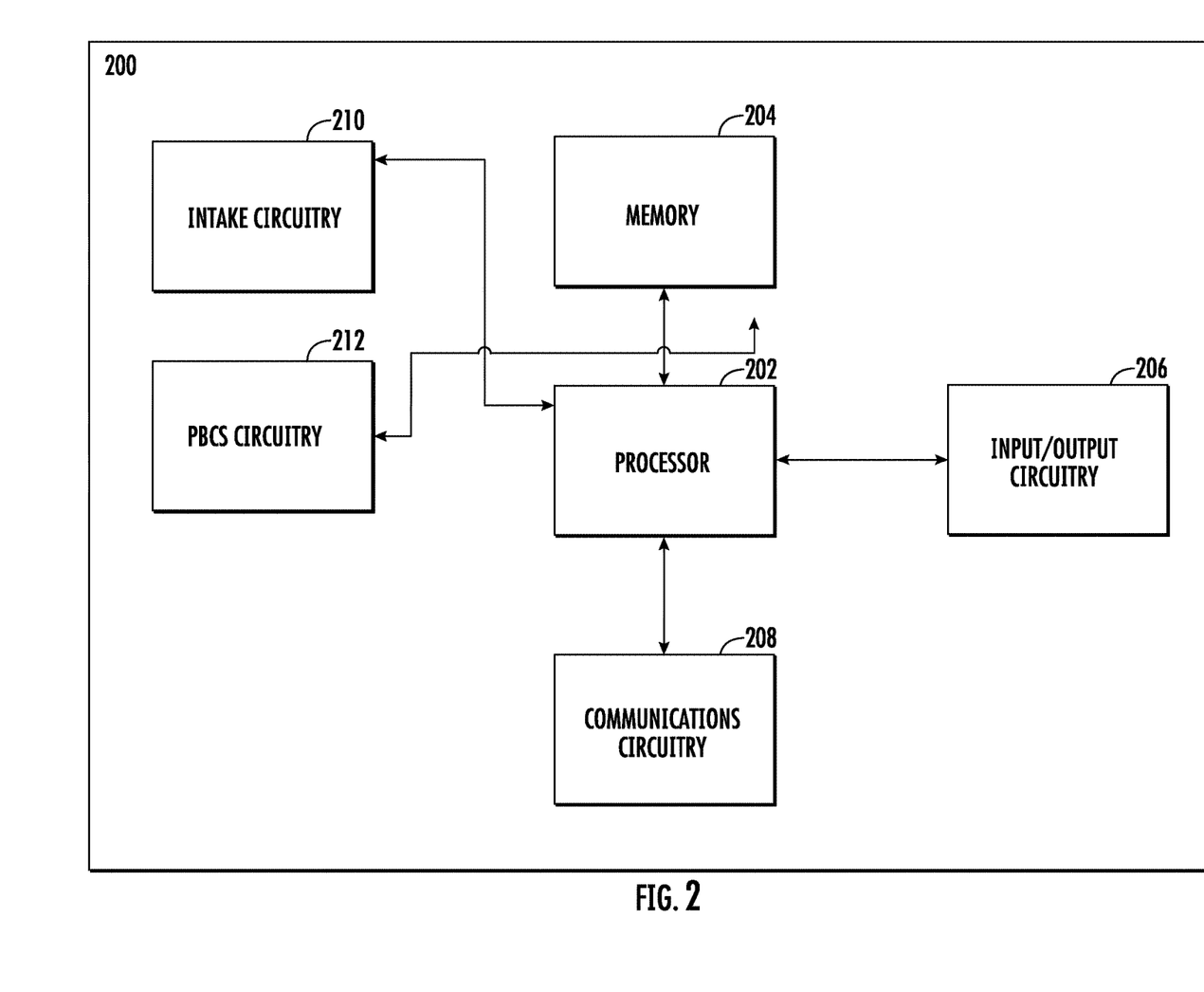
FIG. 2 illustrates a block diagram of an example apparatus that may be specially configured in accordance with at least some example embodiments of the present disclosure.

FIG. 2 illustrates a block diagram of an example apparatus 200 that may be specially configured in accordance with at least some example embodiments of the present disclosure. Specifically, FIG. 2 depicts an example PBCS apparatus 200 ("apparatus 200") specially configured in accordance with at least some example embodiments of the present disclosure.

In some embodiments, the PBCS system 100 and/or a portion thereof is embodied by one or more system(s), such as the apparatus 200 as depicted and described in FIG. 2. The aforementioned system architecture and data flow described in FIGS. 1A and 1B may be performed by the apparatus 200. Further, the outputs shown and described in FIGS. 3A, 3B, and 4 may be generated by the apparatus 200 and one or more of its components. In some embodiments, the apparatus 200 includes a processor 202, a non-transitory memory 204, an input/output circuitry 206, a communications circuitry 208, an intake circuitry 210, and a PBCS circuitry 212. In some embodiments, the apparatus 200 is configured, using one or more of the sets of circuitry 202, 204, 206, 208, 210, and/or 212, to execute and perform the operations described herein.

In general, the terms computing entity (or "entity" in reference other than to a user), device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. In this regard, the apparatus 200 embodies a particular, specially configured computing entity transformed to enable the specific operations described herein and provide the specific advantages associated therewith, as described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), network interface(s), storage medium(s), and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Alternatively or additionally, in some embodiments, other elements of the apparatus 200 provide or supplement the functionality of another particular set of circuitry. For example, the processor 202 in some embodiments provides processing functionality to any of the sets of circuitry, the memory 204 provides storage functionality to any of the sets of circuitry, the communications circuitry 208 provides network interface functionality to any of the sets of circuitry, and/or the like.

In some embodiments, the processor 202 (and/or co-processor or any other processing circuitry assisting or otherwise associated with the processor) is/are in communication with the memory 204 via a bus for passing information among components of the apparatus 200. In some embodiments, for example, the memory 204 is non-transitory and may include, for example, one or more volatile and/or non-volatile memories. In other words, for example, the memory 204 in some embodiments includes or embodies an electronic storage device (e.g., a computer readable storage medium). In some embodiments, the memory 204 is configured to store information, data, content, applications, instructions, or the like, for enabling the apparatus 200 to carry out various functions in accordance with example embodiments of the present disclosure.

In some embodiments, the memory 204 may be configured to store the one or more messages sent between the in-air communication system 10 and the ground-based communication system 20 (e.g., uplink or downlink communications, geographic locations, and/or the like). In some embodiments, the memory 204 may be configured to store metadata extracted from the one or more messages (e.g., timestamps, the type of message, and/or the like). In some embodiments, the memory 204 may be configured to store the one or more performance benchmarks such that the apparatus 200 can readily determine whether or not the one or more performance benchmarks are being met. In some embodiments, the memory 204 may store the generated outputs shown in at least FIGS. 3A, 3B, and 4. The memory 204 may store the outputs in one or more formats. In some embodiments, information stored in the memory 204 may be accessed by a user of the apparatus 200. For example, as the output table 500 shown in FIGS. 3A and 3B, or as the GUI output 600 shown in FIG. 4.

The processor 202 may be embodied in a number of different ways. For example, in some example embodiments, the processor 202 includes one or more processing devices configured to perform independently. Additionally or alternatively, in some embodiments, the processor 202 includes one or more processor(s) configured in tandem via a bus to enable independent execution of instructions, pipelining, and/or multithreading. The use of the terms "processor" and "processing circuitry" should be understood to include a single core processor, a multi-core processor, multiple processors internal to the apparatus 200, and/or one or more remote or "cloud" processor(s) external to the apparatus 200.

In an example embodiment, the processor 202 is configured to execute instructions stored in the memory 204 or otherwise accessible to the processor. Alternatively or additionally, the processor 202 in some embodiments is configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Alternatively or additionally, as another example in some example embodiments, when the processor 202 is embodied as an executor of software instructions, the instructions specifically configure the processor 202 to perform the algorithms embodied in the specific operations described herein when such instructions are executed.

In some embodiments, the processor 202 may be configured to perform the functions of the processors 106A and 106B, as previously described. In some embodiments, the processor 202 may be configured to retrieve information from the memory 204 to perform one or more functions. In some embodiments, the processor 202 may be configured to process the uplink communications, downlink communications, and/or geographic locations sent between the in-air communication system 10 and the ground-based communication system 20.

In some embodiments, the processor 202 may perform the functions of the decoder 114 and thereby decode the one or more messages stored in the memory 204. Decoded messages may be stored in the memory 204.

In some embodiments, the processor 202 may be configured to determine, using the metadata stored in the memory 204, whether or not one or more performance benchmarks have been met. For example, the processor 202 may process a message sent from the ground-based communication system 20 to the in-air communication system 10, a message sent in reply, associate a timestamp with each message (i.e., what time the ground-based communication system 20 sent a message to the in-air communication system 10 and what time the in-air communication system 10 replied), and then determine whether the in-air communication system sent a reply within time to meet one or more performance benchmarks (e.g., using RCP, was a reply sent within 90 seconds). In some embodiments, the processor may account for network delay in determining whether a performance benchmark was met. In some embodiments, once the processor 202 has determined whether or not a performance benchmark has been met, the processor 202 may output the result (i.e., pass or fail), which may be stored in the memory 204.

In some embodiments, the processor 202 may be configured to further configure a percentage of messages that pass and/or fail the performance benchmarks. For example, the processor 202 may process messages sent between the in-air communication system 10 and the ground-based communication system 20 during a certain leg of the flight; the processor 202 may determine how many of the messages pass or fail the one or more performance benchmarks, then, using the total number of messages sent during the leg of the flight, the processor may determine a percentage of the messages that pass and/or fail the one or more performance benchmarks.

In some embodiments, the apparatus 200 includes input/output circuitry 206 that provides output to the user (e.g., via the publisher 121 and/or output platform 120) and, in some embodiments, to receive an indication of a user input (e.g., to view and/or download the generated output shown in FIGS. 3A, 3B, and 4). In some embodiments, the input/output circuitry 206 is in communication with the processor 202 to provide such functionality. The input/output circuitry 206 may include one or more user interface(s) and in some embodiments includes a display that includes the interface(s) rendered as a web user interface, an application user interface, a user device, a backend system, or the like. In some embodiments, the user input may be the GUI output 600 shown in at least FIG. 4. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 including the processor may be configured to control one or more functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a client device and/or other display associated with a user. In some embodiments the user-facing application may be an enterprise solution, such as FORGE. In some embodiments, the input/output circuitry 206 may enable a user to view the one or more messages, various metadata associated with the one or more messages, and various outputs generated by the PBCS system 100 that relate to the one or more messages and the metadata associated with the one or more messages.

In some embodiments, the apparatus 200 includes communications circuitry 208. The communications circuitry 208 includes any means such as a device or circuitry embodied in either hardware or a combination of hardware and software that is configured to receive and/or transmit data from/to a network and/or any other device, circuitry, or module in communication with the apparatus 200. In this regard, in some embodiments the communications circuitry 208 includes, for example, a network interface for enabling communications with a wired or wireless communications network. Additionally or alternatively in some embodiments, the communications circuitry 208 includes one or more network interface card(s), antenna(s), bus(es), switch(es), router(s), modem(s), and supporting hardware, firmware, and/or software, or any other device suitable for enabling communications via one or more communications network(s). Additionally or alternatively, the communications circuitry 208 includes circuitry for interacting with the antenna(s) and/or other hardware or software to cause transmission of one or more messages via the antenna(s) or to handle receipt of signals received via the antenna(s).

In some embodiments, the communications circuitry 208 may be configured to communicate with the in-air communication system 10 and/or the ground-based communication system 20. In some embodiments, the communications circuitry 208 to may be configured to receive the one or more messages sent between the in-air communication system 10 and the ground-based communication system 20. In at least this way, the communications circuitry 208 may receive the one or more messages and thereby extract metadata from the one or more messages and determine whether the aircraft meets the one or more performance benchmarks, as previously described. In some embodiments, the communications circuitry 208 may be further configured to send outputs generated by the PBCS system 100 from the apparatus 200 to one or other systems. For example, information stored in the memory 204 may be sent by the communications circuitry 208 for further processing outside of the apparatus 200.

The intake circuitry 210 includes hardware, software, firmware, and/or a combination thereof, that supports receiving data associated with operation of the in-air communication system 10 and/or the ground-based communication system 20. For example, in some embodiments, the intake circuitry 210 includes hardware, software, firmware, and/or a combination thereof, that captures and/or receives data associated with one or more of the messages sent between the in-air communication system 10 and the ground-based communication system 20. Additionally or alternatively, in some embodiments, the intake circuitry 210 includes hardware, software, firmware, and/or a combination thereof, that requests data from one or more computing device(s), for example from the in-air communication system 10 or the ground-based communication system 20, and receives the data in response. Additionally or alternatively, in some embodiments, the intake circuitry 210 includes hardware, software, firmware, and/or a combination thereof, that identifies the metadata associated with a particular message. Additionally or alternatively, in some embodiments, the intake circuitry 210 includes hardware, software, firmware, and/or a combination thereof, that maintains one or more datastore(s) including previously received messages (which may also be stored in memory 204). In some embodiments, intake circuitry 210 includes a separate processor, specially configured field programmable gate array (FPGA), or a specially programmed application specific integrated circuit (ASIC). In some embodiments, the intake circuitry 210 may retrieves, receive, and/or otherwise access a relevant message and/or its data for processing.

In some embodiments, the PBCS circuitry 212 includes hardware, software, firmware, and/or a combination thereof, that supports various functionality associated with monitoring, analyzing, and providing real-time measurements to assess a pilot's communication performance, surveillance performance, and pilot-operational response time based one or more messages sent between the in-air communication system 10 and the ground-based communication system 20. For example, in some embodiments, the PBCS circuitry 212 includes hardware, software, firmware, and/or any combination thereof, that processes messages from the intake circuitry 210 to determine a number of messages satisfying one or more performance benchmarks and to determine whether a percentage represented by a number of messages satisfying a particular performance metric satisfies a threshold, and/or outputting an alert. In some embodiments, the PBCS circuitry 212 includes a separate processor, specially configured field programmable gate array (FPGA), or a specially programmed application specific integrated circuit (ASIC).

Example Methods for PBCS

Figure 5:
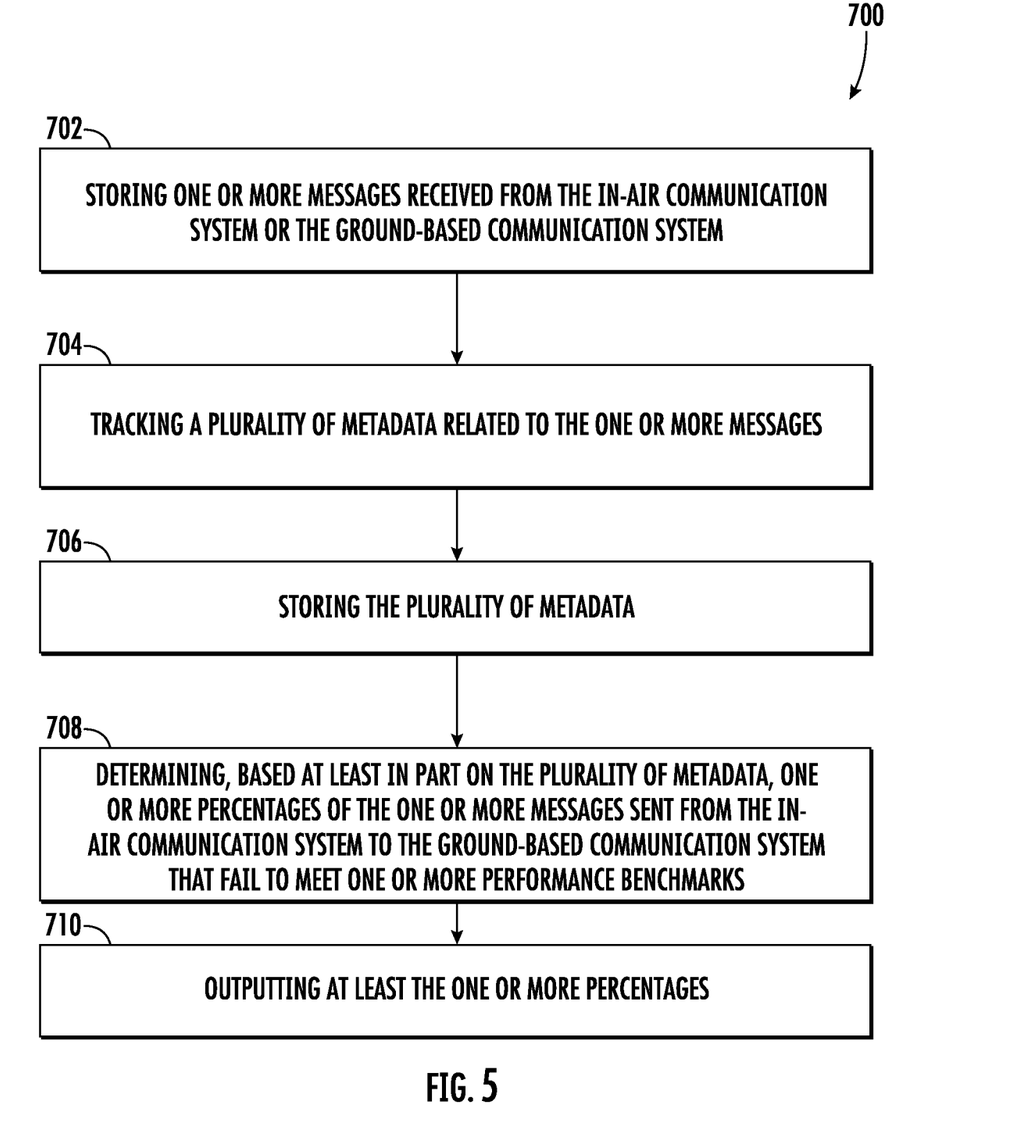
FIG. 5 illustrates an example flow chart for a method for monitoring communications between an in-air communication system and a ground-based communication system.

FIG. 5 shows an example flow chart illustrating an example method 700 for monitoring communications between an in-air communication system 10 and a ground-based communication system 20. In some embodiments, the method 700 may be performed using the systems, apparatuses, and/or their respective components, as previously described. It will be understood that the method 700 may be performed using any suitable systems. For example, for case of understanding and brevity of the disclosure, the method 700 is discussed without limitation as performed from the perspective of the apparatus 200 as depicted and described herein.

In some embodiments, the method 700 may include a step 702 of storing one or more messages received from the in-air communication system 10 or the ground-based communication system 20. In some embodiments, the one or more messages may be monitored via the communications circuitry 208 of the apparatus 200. In some embodiments, the one or more messages may be communications (uplink communications or downlink communications) or a geographic location (e.g., an aircraft's location). The messages may be associated with operations and/or status reports of operations of vehicles as they are performing such operations, the messages may be received over different networks, the messages may be received from different systems, the messages may be retrieved from databases of those individual systems, etc. The messages may be stored in the memory 204 of the apparatus 200, as previously described.

In some embodiments, the method 700 may include a step 704 of tracking a plurality of metadata related to the one or more messages. Metadata may include, but is not limited to the metadata as previously described, including a timestamp associate with each of the one or more messages, a flight leg on which the one or more message was sent, a date on which the message was sent, the type of message that was sent (e.g., an uplink or downlink communication or a geographic location), and/or the like. In some embodiments, the apparatus 200 may be configured to store the metadata within the memory 204, as previously described. In some embodiments, different metadata may be tracked depending on the type of message (another type of metadata). For example, with messages that are geographic locations, the coordinates may be a type of metadata that is tracked, while coordinates may not be included in messages that are uplink or downlink communications.

In some embodiments, the method 700 may include a step 706 of storing the plurality of metadata. In some embodiments, the metadata may be stored in the memory 204 of the apparatus 200. In some embodiments, the metadata may be stored in a separate device than the apparatus 200 and may be accessed externally by the apparatus 200, as desired. The metadata may be stored and associated with the one or more messages. Various types of storage and association may be utilized. For example, a table may be created (similar to the table output 500 shown in FIG. 4) where the one or more messages are listed (for example, in one column), and then corresponding rows contain associated metadata. This association of messages to metadata. can be seen in at least FIG. 4. In some embodiments, the messages and metadata may be stored in such a way that they are associated as they are stored. In some embodiments, the messages and metadata may be stored in an unassociated way and then associated later (e.g., by a processor 202 and/or the like).

In some embodiments, the method 700 may include a step 708 of determining, based at least in part on the plurality of metadata, one or more percentages of the one or more messages sent from the in-air communication system to the ground-based communication system that fail to meet one or more performance benchmarks. As previously described, the processor 202 may determine whether a message met the performance benchmark. Performance benchmarks may be determined based on various standards For example, standards set by regulatory bodies or by aircraft personnel to increase their own efficiency. In some embodiments, performance benchmarks require the one or more messages to be sent within a set time frame. For example, the in-air communication system 10 may need to respond to a message from the ground-based communication system 20 within a set period of time to meet a performance benchmark; therefore, the processor may determine whether the message has met the performance benchmark by taking one piece of metadata (timestamp when the ground-based communication system 20 sent a message), another piece of metadata (timestamp when the in-air communication system 10 responded), and then calculating the total time for response based on those two pieces of metadata. In some embodiments, the processor 202 may be further configured to consider errors in the network 400 that may cause communication delays. The apparatus 200 may determine whether each of the one or more message passed the performance benchmark and, if any did not, calculate one or more percentages based on the number of messages that did and did not pass the performance benchmark. It will be understood that more than one performance benchmark may be used (e.g., RSP and RCP, as previously described) and that more than one percentage may therefore be calculated.

In some embodiments, the method 700 may include a step 710 of outputting at least the one or more percentages. In some embodiments, the output of the one or more percentages may take the form of the table output 500 shown in FIGS. 3A and 3B and/or the GUI output 600 shown in FIG. 4. It will be understood that various types of outputs may be used to present the one or more percentages. In some embodiments, the step 710 may be performed by the apparatus 200 upon completion of a flight or a leg of a flight. In some embodiments, the step 710 may be performed by the apparatus 200 during the flight, and the outputting of percentages may be sent to aircraft personnel or an associated ground team to provide real-time indicators of whether performance benchmarks are being met.

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for monitoring communications between an in-air communication system and a ground-based communication system, the method comprising:
   storing one or more messages received from the in-air communication system or the ground-based communication system;
   tracking a plurality of metadata related to the one or more messages;
   storing the plurality of metadata;
   determining, based at least in part on the plurality of metadata, one or more percentages of the one or more messages sent from the in-air communication system to the ground-based communication system that fail to meet one or more performance benchmarks, wherein determining the one or more percentages of the one or more messages sent from the in-air communication system to the ground-based communication system that fail to meet the one or more performance benchmarks comprises:
      determining a required surveillance performance criteria by determining an amount of time taken for an automatic dependent surveillance-contract (ADS-C) downlink report to reach the ground-based communication system and adjusting the amount of time according to any identified network delays; and
   responsive to determining the one or more percentages fail to meet the one or more performance benchmarks, triggering a real-time alarm to the in-air communication system indicating failed compliance with the one or more performance benchmarks.

2. The method of claim 1, further comprising updating a transaction between the ground-based communication system and the in-air communication system.

3. The method of claim 1, wherein the one or more messages comprise one or more of geographic location coordinates.

4. The method of claim 3, wherein the one or more messages comprise one or more communications.

5. The method of claim 4, wherein the one or more performance benchmarks comprise a benchmark for required communication performance criteria and a benchmark for the required surveillance performance criteria.

6. The method of claim 5, wherein the required communication performance criteria is determined using Controller Pilot Datalink Communication (CPDLC) Message Transactions.

7. The method of claim 6, wherein the one or more percentages comprise a first percentage and a second percentage, and wherein the method further comprises determining the first percentage of the one or more messages sent from the in-air communication system to the ground-based communication system that fail to meet the benchmark for the required communication performance criteria and the second percentage of the one or more messages that comprise the geographic location coordinates that fail to meet the benchmark for the required surveillance performance criteria.

8. The method of claim 7, further comprising triggering an alarm if one or more of the first percentage or the second percentage fail to exceed the required communication performance criteria or the required surveillance performance criteria.

9. The method of claim 1, wherein the plurality of metadata comprises:
   a plurality of timestamps indicating, for each of the one or more messages, when the in-air communication system or the ground-based communication system received or sent the one or more messages;
   a first value indicating the one or more messages sent from the in-air communication system to the ground-based communication system; and
   a second value indicating the one or more messages sent from the ground-based communication system to the in-air communication system;
   a third value indicating the one or more messages that comprise geographic location coordinates; and
   a fourth value indicating the one or more messages that comprise a communication.

10. The method of claim 9, wherein the one or more percentages comprise:
    a first percentage comprising a percentage of the first value that fail to meet a benchmark for a required communication performance criteria; and
    a second percentage comprising a percentage of the second value that fail to meet a benchmark for the required communication performance criteria; and
    wherein the method further comprises:
    rendering one or more user interface elements displaying one or more of:
    the plurality of timestamps;
    the first value;
    the second value;
    the third value;
    the fourth value;
    the first percentage; and
    the second percentage.

11. The method of claim 1, further comprising determining a pilot operational response time (PORT) based on the one or more performance benchmarks.

12. The method of claim 11, wherein determining the pilot operational response time (PORT) comprises determining one or more network delays associated with a network used by the in-air communication system or the ground-based communication system to transmit the one or more messages.

13. The method of claim 1, wherein tracking the plurality of metadata comprises decoding the one or more messages using a decoder.

14. A performance-based communication and surveillance (PBCS) system for monitoring communications between an in-air communication system and a ground-based communication system, the PBCS system comprising:
a database;
a data center; and
a processor,
wherein the database is configured to store one or more messages received from the in-air communication system or the ground-based communication system and to store a plurality of metadata related to the one or more messages, and wherein the processor is configured to:
track the plurality of metadata related to the one or more messages; determine one or more percentages of the one or more messages sent from the in-air communication system to the ground-based communication system that fail to meet one or more performance benchmarks by determining a required surveillance performance criteria by determining an amount of time taken for an automatic dependent surveillance-contract (ADS-C) downlink report to reach the ground-based communication system and adjusting the amount of time according to any identified network delays;
responsive to determining the one or more percentages fail to meet the one or more performance benchmarks, trigger a real-time alarm to the in-air communication system indicating failed compliance with the one or more performance benchmarks.

15. The PBCS system of claim 14, wherein the one or more messages comprise one or more of geographic location coordinates or a communication.

16. The PBCS system of claim 15, wherein the one or more performance benchmarks comprise a benchmark for required communication performance criteria and a benchmark for the required surveillance performance criteria.

17. The PBCS system of claim 16, wherein the processor is further configured to determine a required communication performance using Controller Pilot Datalink Communication (CPDLC) Message Transactions.

18. The PBCS system of claim 17, wherein the one or more percentages comprise a first percentage and a second percentage, and wherein the processor is further configured to determine the first percentage of the one or more messages sent from the in-air communication system to the ground-based communication system that fail to meet the benchmark for the required communication performance criteria and the second percentage of the one or more messages that comprise the geographic location coordinates that fail to meet the benchmark for the required surveillance performance criteria.

19. The PBCS system of claim 14, wherein the plurality of metadata comprises:
a plurality of timestamps indicating, for each of the one or more messages, when the in-air communication system or the ground-based communication system received or sent the one or more messages;
a first value indicating the one or more messages sent from the in-air communication system to the ground-based communication system; and
a second value indicating the one or more messages sent from the ground-based communication system to the in-air communication system;
a third value indicating the one or more messages that comprise geographic location coordinates; and
a fourth value indicating the one or more messages that comprise a communication.

20. The PBCS system of claim 19, wherein the one or more percentages comprise:
a first percentage comprising a percentage of the first value that fail to meet a benchmark for a required communication performance criteria; and
a second percentage comprising the percentage the second value that fail to meet the benchmark for a required communication performance criteria; and wherein the processor is further configured to render one or more user interface elements displaying one or more of:
the plurality of timestamps;
the first value;
the second value;
the third value;
the fourth value;
the first percentage; and
the second percentage.

* * * * *